United States Patent [19]
Natra

[11] Patent Number: 6,091,338
[45] Date of Patent: Jul. 18, 2000

[54] SYSTEM AND METHOD FOR SAFETY PROTECTION OF XDSL CIRCUITRY

[75] Inventor: Gabi Natra, Ramat Aviv, Israel

[73] Assignee: Tadiran Telecommunications Ltd., Petach Tikva, Israel

[21] Appl. No.: 09/246,356

[22] Filed: Feb. 8, 1999

[51] Int. Cl.$^7$ .............................. G08B 21/00; H04M 1/24
[52] U.S. Cl. .................................. 340/664; 379/1; 379/24
[58] Field of Search ..................................... 370/241, 242; 375/222, 227, 220, 224; 379/26, 29, 30, 33, 1, 24; 340/664

[56] References Cited

U.S. PATENT DOCUMENTS

| 3,863,036 | 1/1975 | McCrudden | 379/146 |
| 4,459,437 | 7/1984 | Gabry et al. | 324/52 |
| 5,438,606 | 8/1995 | Cerulli | 379/24 |
| 5,668,857 | 9/1997 | McHale | 379/93.07 |
| 5,926,529 | 7/1999 | Hache et al. | 379/114 |

OTHER PUBLICATIONS

"Technical Help to Exporters", British Standards Institution, Linford Wood, Milton Keynes, MK 14 6LE Jun. 1983.
"Specification for Safety of Information Technology Equipment, Including Electrical Business Equipment", European Standard EN 60950 Jan. 1992.

Primary Examiner—Donnie L. Crosland
Attorney, Agent, or Firm—Mark M. Friedman

[57] ABSTRACT

A safety protection system and a related operational method for the electrical protection of users of XDSL communication circuitry. The system is based on continuous monitoring of the current parameters on both the exchange and the remote subscriber ends of the XDSL communication system. The safety protection system samples, digitizes and compares the currents at both XDSL communication system ends. The measured currents are compared to specific limiting current and currents difference levels, based on the relevant safety requirements. Whenever required, based on the measured currents status, the safety system shuts down the XDSL communication system, or limits its maximum current. In another embodiment of the invention the safety system is based on continuous monitoring of the voltages related to ground of the two system communication wires, on one or both of the exchange and the remote subscriber ends of the XDSL communication system. The safety system compares the measured voltages and limits the XDSL system current to a safety protected level, if one of the wire voltages is different by at least a predefined voltage increment related to the second wire voltage.

13 Claims, 2 Drawing Sheets

SYSTEM AND METHOD FOR SAFETY PROTECTION OF XDSL CIRCUITRY

FIELD AND BACKGROUND OF THE INVENTION

The present invention relates to safety protection for XDSL, all digital subscriber loops circuitry and, more particularly, to a safety protection system and the related system operational method for the electrical protection of users of XDSL circuitry, which is based on continuous monitoring of the current or voltage parameters on one or both of the exchange and the remote subscriber ends of the XDSL communication system.

Very often the required operational electrical power of the remote subscriber unit must be directly fed from the communication system exchange side. Good examples for such a remote power supply are pair gain systems. There are various safety standards such as EN60950 and DIN57-0800 part 3e, which generally do not allow for the system end units drive voltage to exceed 120 volts for DC voltage supply and 50 volts R.M.S. for the case of AC voltage supply. Currents over 60 MA on telephone wires are not permitted by the relevant safety standards.

When it is required to supply the operational driving power to the remote subscriber unit from the exchange unit, through the XDSL communication system, there is a power limit on the maximum available drive power. The power limit is the product of the relevant safety standards' maximum allowed current with the maximum allowed voltage.

Present art XDSL communication systems subscriber unit operational power requirements do not meet the relevant safety standards power limitation demands, with voltages as high as 320 volts DC prevalent. However the current limit of 60 MA is generally strictly observed.

Several safety hazardous situations might be occurred which involve the misuse of XDSL communication systems. In particular a hazardous situation might develop when a person touches one or both of the wires of the XDSL communication system. If only one wire is touched, the person in touch creates through his body a low impedance electrical path to ground, through this single wire. If the XDSL system is designed to be fully electrically floating, then no current will pass through the person touching the wire, as the entire system will then float to ground. If the XDSL communication system will not be fully floating the hazardous safety situation of a person touching only one of the system's wires will cause an unbalanced load when measured from the exchange output leads, where one wire shows a low impedance path to ground while the other wire shows the remote unit load. Another hazardous situation might develop when a person touches both system wires, in this case some of the system current will flow through the low impedance electrical path presented by the touching person body, instead of driving the remote unit load.

It is required to prevent currents that are higher than the safety limit of 25 MA to flow through the person touching the system wires. Other maximum allowable current level safety limits might be defined and secured by the safety system, but it is believed that the threshold limit on currents not to exceed 25 MA is required, as higher currents are believed to be harmful to the human body.

There is a recognized need for, and it would be highly advantageous to have a safety system and a related safety protection method that would enable enhanced XDSL communication system safety.

SUMMARY OF THE INVENTION

According to the present invention there is provided a safety system and methods for adding to a XDSL communication system a safety protection system solution that resolves most typical hazardous operational conditions related to protecting the safety of a person touching one or more of the system wires.

According to the present invention there is provided a safety system for an XDSL communications system of the type wherein an exchange unit communicates with a remote unit via a plurality of wires, including: (a) a first current detector, in the exchange unit; (b) a second current detector, in the remote unit; (c) a first control sub-unit, in the exchange unit, for receiving current measurements from the first current detector; and (d) a second control sub-unit, in the remote unit, for receiving current measurements from the second current detector; the first and second control sub-units managing a communications protocol between the exchange unit and the remote unit to exchange relevant information via the wires.

According to the present invention there is provided a safety system for an XDSL communications system of the type wherein an exchange unit communicates with a remote unit via a plurality of wires, including: (a) in a unit selected from the group consisting of the exchange unit and the remote unit: (i) a first voltage detector, for measuring a first voltage between a first of the wires and ground, and (ii) a second voltage detector, for measuring a second voltage between a second of the wires and ground; and (b) a first control sub-unit, in the exchange unit, for effecting a corrective action based on the first and second measured voltages.

According to the present invention there is provided a method of safety protection in an XDSL communications system of the type wherein an exchange unit communicates with a remote unit via a plurality of wires, including the steps of: (a) measuring a first current in the exchange unit; (b) measuring a second current in the remote unit; (c) comparing the first and second measured currents; and (d) depending on the comparison, effecting a corrective action selected from the list consisting of shutting down the XDSL system and limiting the first current to a fixed value.

According to the present invention there is provided a method of safety protection in an XDSL communications system of the type wherein an exchange unit communicates with a remote unit via a plurality of wires, including the steps of: (a) at a unit selected from the group consisting of the exchange unit and the remote unit: (i) measuring a first voltage difference between one of the wires and ground, and (ii) measuring a second voltage difference between another of the wires and ground; (b) comparing the two measured voltage differences; and (c) based on the comparing, effecting a corrective action selected from the list consisting of shutting down the XDSL system and limiting a current in the wires to a fixed value.

The description below concentrates on the operation of the present invention safety system.

In normal operation of the XDSL communication system of the present invention the digitized data of the measured current at the remote unit, is passed back to the exchange unit through the system bit stream. The exchange unit compares the results of the measured current in the local current detector, to the measured current received as data through the system wires from the remote unit current detector. If there is a difference bigger than 5 MA between the measured current in the exchange unit and the measured current in the remote unit and the current measured at the exchange unit is over 25 MA, then the XDSL system is shut down after a specified delay, or the XDSL system is then current limited to 25 MA.

According to further features in another preferred embodiment of the invention described below, if there is a difference bigger than 5 MA between the two measured currents and the current measured at the remote unit is over 35 MA, then the XDSL system is shut down after a specified delay, or the XDSL system is then current limited to 25 MA.

In a start up mode before full communication is established the XDSL system is current-limited to 25 MA. This current limit does not affect the remote unit operation at the start-up mode, as this unit's operational current requirement is less than 25 MA. The operating current of the system, in the event that clear communication is not established by the XDSL system, is limited to 25 MA. In normal operational conditions of the XDSL communication system, a current leakage to ground often exists. The leakage leads to the system current measurement results, under which the current measured by the current detector at the remote unit is not exactly matched to the current measured by the detector at the exchange unit side. A certain normal working mode difference tolerance in the order of 2 to 5 MA is therefore allowed between the exchange unit measured current and the receiver unit measured current.

The present invention also provides a second protection method, in which voltage differences between the wires connecting the exchange and remote units and ground are measured, and corrective action is effected if these voltage differences differ by more than a predefined voltage increment. This second protection method is simpler for implementation however it does not protect the XDSL system in the event that both wires are touched simultaneously.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
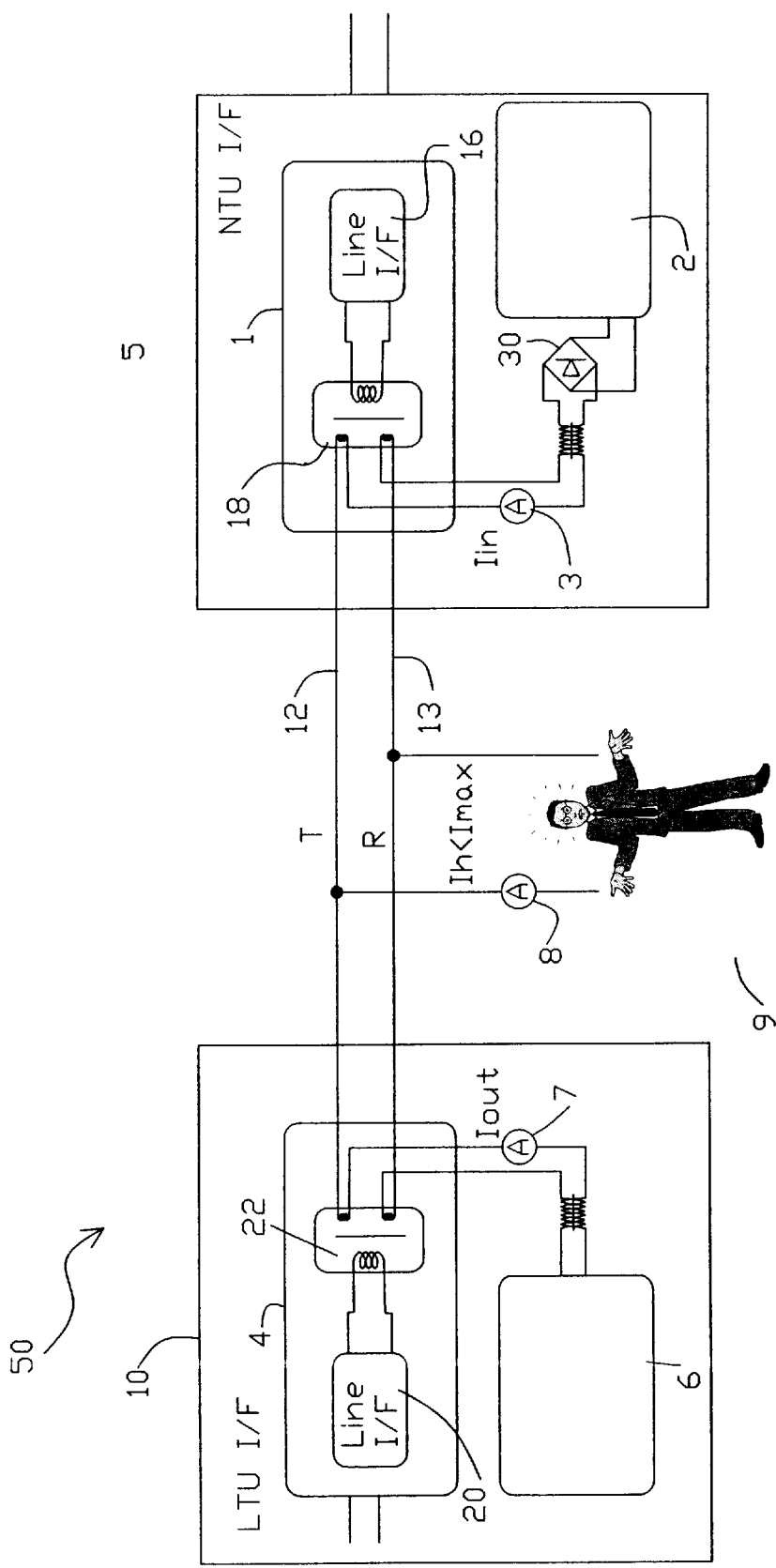
FIG. 1 is a schematic illustration of a first preferred embodiment of a safety system according to the present invention.

The present invention is of a safety protection system and the related system operational methods for the electrical protection of users of XDSL circuitry, which is based on continuous monitoring of the currents or voltages parameters in one or both of the exchange and the remote subscriber units of the communication system.

The safety protection system compares the currents or voltages in one or both of XDSL communication system units, according to a decision-making algorithm. Whenever required, based on the measurements and the algorithm analysis results, the present invention safety system shuts down the XDSL communication system, or limits its current to 25MA The principles and operation of a system according to the present invention may be better understood with reference to the drawing and accompanying descriptions.

Referring now to the drawings, FIG. 1 illustrates a first preferred embodiment of a safety protection system for the electrical protection of users of XDSL circuitry according to the present invention, which is referred to herein below as system 50.

XDSL circuitry safety protection system 50 includes a remote subscriber unit 5, an exchange unit 10 and tip and ring wires T and R marked 12 and 13, respectively, connecting the exchange and the subscriber units, the T and R lines 12,13 may be of any length.

Exchange unit 10 is connected to tip and ring wires 12,13 through a sub-unit 4 which includes a line I/F circuit 20 and a line isolation transformer 22.

Unit 10 also includes unit 6 which includes a power supply and a control sub-units and a current detector 7. Remote subscriber unit 5 is connected to tip and ring wires 12,13 through a sub-unit 1 which includes a line I/F circuit 16 and a line isolation transformer 18. Unit 5 also includes a current detector 3, and a rectifier bridge 30 for protecting against having the wires connected in inverse order. The DC voltage transferred over tip and ring wires 12,13 are fed to unit 2 which includes a power supply and a control sub-unit. Unit 2 receives power over the T and R wires 12 and 13 and does a DC to DC conversion for operating the subscriber unit and all associated end subscriber equipment (for example telephones or modems attached to the subscriber unit). A person 9 touching both T and R wires 12 and 13 is shown to illustrate a safety hazardous situation where the current flowing through the body and measured by a current detector 8 might exceed the safety limit of 25 MA and thus endanger the person's life.

The operation of the present invention safety system is as follows:

In normal operation of the XDSL communication system the remote current is measured in the remote subscriber unit 5, by current detector 3, and the measured current is digitized and processed by remote subscriber control sub-unit 2 of subscriber unit 5. To evaluate if the measured current is within specific parameters margin requirements, relevant data is passed back to control sub-unit 6 of the exchange unit through the system data bit stream by wires 12,13, using either one spare time slot of user data, or the overhead channel of the XDSL bit stream, known as the EOC—Embedded Operation Channel. One of two communications protocols may be used between exchange unit 10 and remote subscriber unit 5. The actual current value sensed by remote current detector 3, can be fed back in digital format using an A/D converter and the available digital channel as mentioned. Alternatively, specific values can be transferred using only one or two bits of the channel. For example, it might only matter whether the remote unit receives over 25 MA or over 35 MA. In this case, two bits would be set according to the result of the current detector, each bit representing one of those two values. The values must be chosen so that at maximum current, we can detect a leakage of the safety value, which we currently believe to be 25 MA. Since the maximum allowable current in the system is set at 60 MA, as a result if I(eu) (Exchange Unit current) is at 60 MA and I(ru) is lower than 35 MA then a current of at least 25 MA is lost and corrective action must be taken. Exchange unit 10 compares the results of the measured current in the local current detector 7, to the measured current received through the system from the remote unit current detector 3. If there is a difference of at least 5 MA between the two measured currents, then the safety system either shuts down the XDSL system or limits the exchange unit current to 25 MA. In the event that discrete current detectors are used, the system may allow for a loss of up to 25 MA, prior to issuing corrective action.

In a start up mode before fall communication is established the present invention XDSL system is current limited to 25 MA. This current limit does not affect the remote unit operation at the start-up mode, as this unit's operational current requirement in start up is less than 25 MA. The operating current of the system, in the event that clear communication is not established by the XDSL system, is limited to 25 MA. In normal operational conditions of the XDSL communication system, a current leakage to ground often exists. The leakage leads to the system current measurement results under which the current measured by the current detector 3 at the remote unit is not exactly matched to the current measured by detector 7 at the exchange unit side. A certain normal working mode difference tolerance in the order of 2 to 5 MA is therefore allowed between the exchange unit measured current and the Receiver unit measured current.

As an example of the of a realistic case of the present invention safety system operation, using discrete current detector values, the safety procedure of testing and sampling the currents at both units 5 and 10 of the safety system may be realized on a case of detecting the current at the exchange unit 10 to be equal or over 40 MA and detecting that the current at the remote unit 5 is over 35 MA. If the current measured at the exchange unit 10 is over 40 MA and the current measured at the remote unit 5 is lower than 35 MA then exchange unit 10 interprets the state of the XDSL system as having a current leakage of over 5 MA and the system is shut down or current limited to 25 MA. If on the other hand the current measured at the exchange unit 10 is 40 MA and the current measured at the remote unit 5 is equal or higher than 35 MA, then exchange unit 10 interprets the state of the XDSL system as normal. Since the system is current limited to 60 MA, using 35 MA as a measurement point, will ensure that no leakage over 25 MA is missed.

Alternatively, remote unit 5 could simply feed back the digital representation of the current detected. Control unit 6 would then compare the digital representation of current detector 7, and in any event of a difference of 5 MA either current limit the system, or shut down the system.

Figure 2:
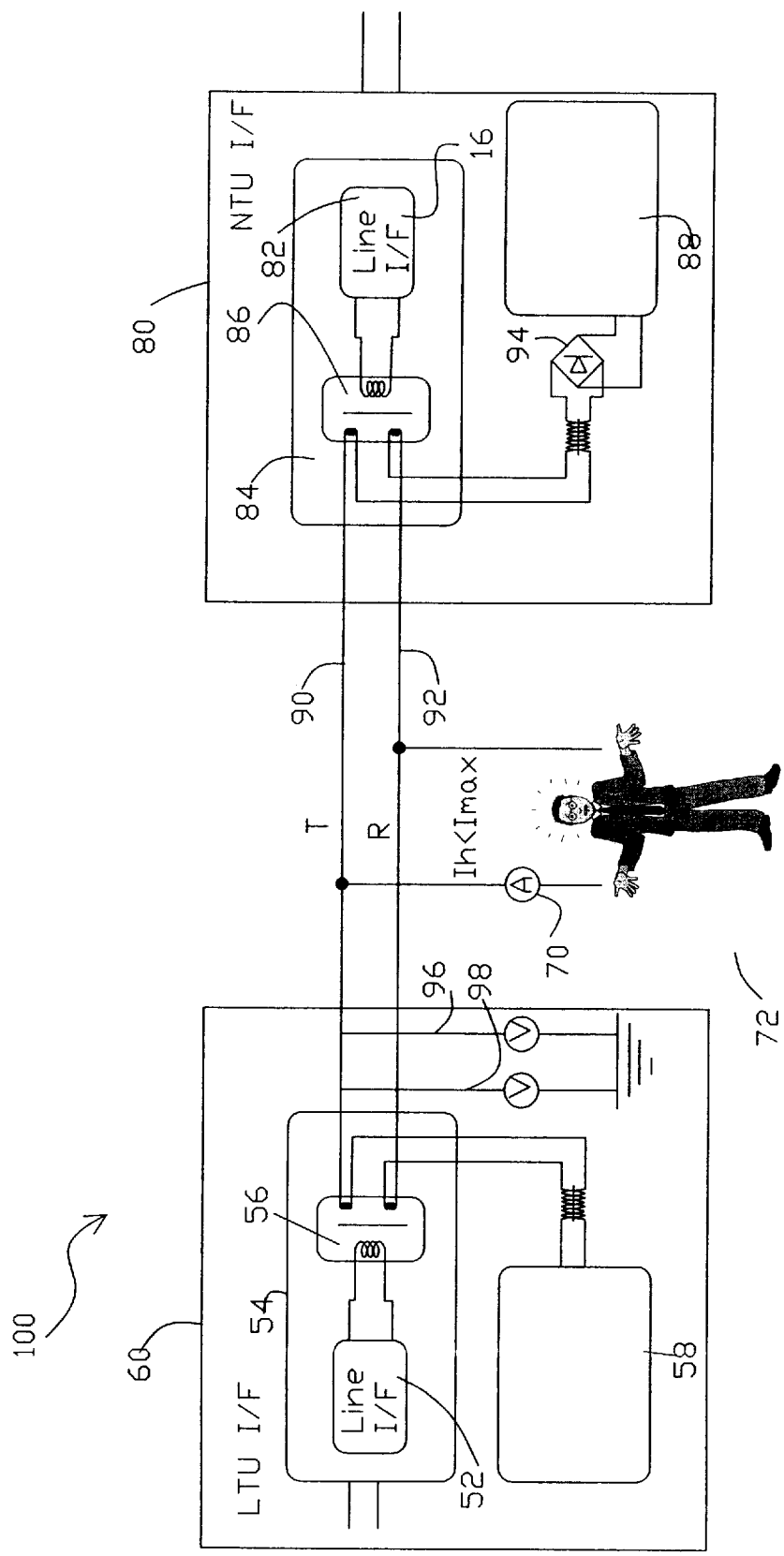
FIG. 2 is a schematic illustration of a second preferred embodiment of a safety system according to the present invention.

FIG. 2 illustrates a second preferred embodiment of a safety protection system for the electrical protection of users of XDSL circuitry according to the present invention, which is referred to herein below as system 100.

XDSL circuitry safety protection system 100 includes a remote subscriber unit 80, an exchange unit 60 and tip and ring wires T and R marked 90 and 92, respectively, connecting the exchange and the subscriber units, the T and R lines 90,92 may be of any length.

Exchange unit 60 is connected to tip and ring wires 90,92 through a sub-unit 54 which includes a line I/F circuit 52 and a floating line isolation transformer 56.

Unit 60 also includes unit 58 which includes a power supply and a control sub-units. Voltage detectors 96 and 98 are also a part of unit 60, voltage detector 98 is connected between wire 92 and ground and voltage detector 96 is connected between wire 90 and ground.

Remote subscriber unit 80 is connected to the tip and ring wires 90,92 through a sub-unit 84 which includes a line I/F circuit 82 and a line isolation transformer 86. Unit 80 also includes a rectifier bridge 94 and unit 88 which includes a power supply and a control sub-units. Unit 88 receives power over the T and R wires 90 and 92 and does a DC to DC conversion for operating the subscriber unit and all associated end subscriber equipment (for example telephones or modems attached to the subscriber unit). A person 72 touching any of one of T and R wires 90 and 92 is shown to illustrate a safety hazardous situation where the current flowing through the body and measured by a current detector 72 might exceed the safety limit of 25 MA and thus endanger the person's life.

The operation of the present invention safety system is as follows:

In normal operation of the XDSL communication system unit 58 in exchange unit 60 compares the results of the measured voltages in the local voltage detectors 96 and 98, if there is a difference larger than a small predefined voltage increment between the two measured voltages, then the XDSL system is either shut down or current limited 25 MA.

In FIG. 2, voltage detectors 96 and 98 are shown connected to wires 90 and 92 in unit 60. It will be appreciated that, alternatively, voltage detectors 96 and 98 could be connected to wires 90 and 92 in unit 80. In the latter case, control sub-units 58 and 88 exchange relevant information via wires 90 and 92 in the manner described above in the context of the embodiment of FIG. 1.

It is to be understood that the invention is not limited in its applications to the details of construction and the arrangement of the components set forth in the above description or illustrated in the drawings. The invention is capable of other embodiments, or of being practiced or carried out in various ways. Also, it is to be understood that the phraseology and terminology employed above is for the purpose of description and should not be regarded as limiting.

What is claimed is:

1. A safety system for an XDSL communications system of the type wherein an exchange unit communicates with a remote unit via a plurality of wires, comprising:

(a) a first current detector, in the exchange unit;
   (b) a second current detector, in the remote unit;
   (c) a first control sub-unit, in the exchange unit, for receiving current measurements from said first current detector; and
   (d) a second control sub-unit, in the remote unit, for receiving current measurements from said second current detector;

said first and second control sub-units managing a communications protocol between the exchange unit and the remote unit to exchange relevant information via said wires.

2. The safety system of claim 1, wherein said first control sub-unit is operative to effect a corrective action based on said information.

3. The safety system of claim 2, wherein said corrective action is selected from the group consisting of shutting down the XDSL system and limiting a current in said wires to a fixed value.

4. The safety system of claim 3, wherein said fixed value is about 25 MA.

5. A safety system for an XDSL communications system of the type wherein an exchange unit communicates with a remote unit via a plurality of wires, comprising:

(a) in a unit selected from the group consisting of the exchange unit and the remote unit:
      (i) a first voltage detector, for measuring a first voltage between a first of the wires and ground, and
      (ii) a second voltage detector, for measuring a second voltage between a second of the wires and ground; and
   (b) a first control sub-unit, in the exchange unit, for effecting a corrective action based on said first and second measured voltages.

6. The safety system of claim 5, wherein said first and second voltage detectors are in the exchange unit, said first control sub-unit receiving said first and second measured voltages from said first and second voltage detectors.

7. The safety system of claim 5, wherein said voltage detectors are in the remote unit, the safety system further comprising:
   (c) a second control sub-unit, in the remote unit, for receiving said first and second measured voltages from said first and second voltage detectors, said first and second control sub-units managing a communication protocol between the exchange unit and the remote unit to exchange relevant information via the wires.

8. A method of safety protection in an XDSL communications system of the type wherein an exchange unit communicates with a remote unit via a plurality of wires, comprising the steps of:
   (a) measuring a first current in the exchange unit;
   (b) measuring a second current in the remote unit;
   (c) comparing said first and second measured currents; and
   (d) depending on said comparison, effecting a corrective action selected from the list consisting of shutting down the XDSL system and limiting said first current to a fixed value.

9. The method of claim 8, wherein said corrective action is effected if said first current exceeds said second current by more than about 5 MA.

10. The method of claim 8, wherein said fixed value is about 25 MA.

11. A method of safety protection in an XDSL communications system of the type wherein an exchange unit communicates with a remote unit via a plurality of wires, comprising the steps of:
   (a) at a unit selected from the group consisting of the exchange unit and the remote unit:
      (i) measuring a first voltage difference between one of the wires and ground, and
      (ii) measuring a second voltage difference between another of the wires and ground;
   (b) comparing said two measured voltage differences; and
   (c) based on said comparing, effecting a corrective action selected from the list consisting of shutting down the XDSL system and limiting a current in said wires to a fixed value.

12. The method of claim 11, wherein said corrective action is effected if said first voltage difference differs from said second voltage difference by more than a predefined voltage increment.

13. The method of claim 11, wherein said fixed value is about 25 MA.

* * * * *